C. P. STRITE.
GOVERNOR PULLEY DEVICE.
APPLICATION FILED MAY 1, 1911.

1,109,877.

Patented Sept. 8, 1914.
2 SHEETS—SHEET 1.

Witnesses:
W. A. Loftus
A. G. Hague

Inventor.
Charles P. Strite.
by J. Ralph Irwin Atty.

C. P. STRITE.
GOVERNOR PULLEY DEVICE.
APPLICATION FILED MAY 1, 1911.
1,109,877.
Patented Sept. 8, 1914.
2 SHEETS—SHEET 2.
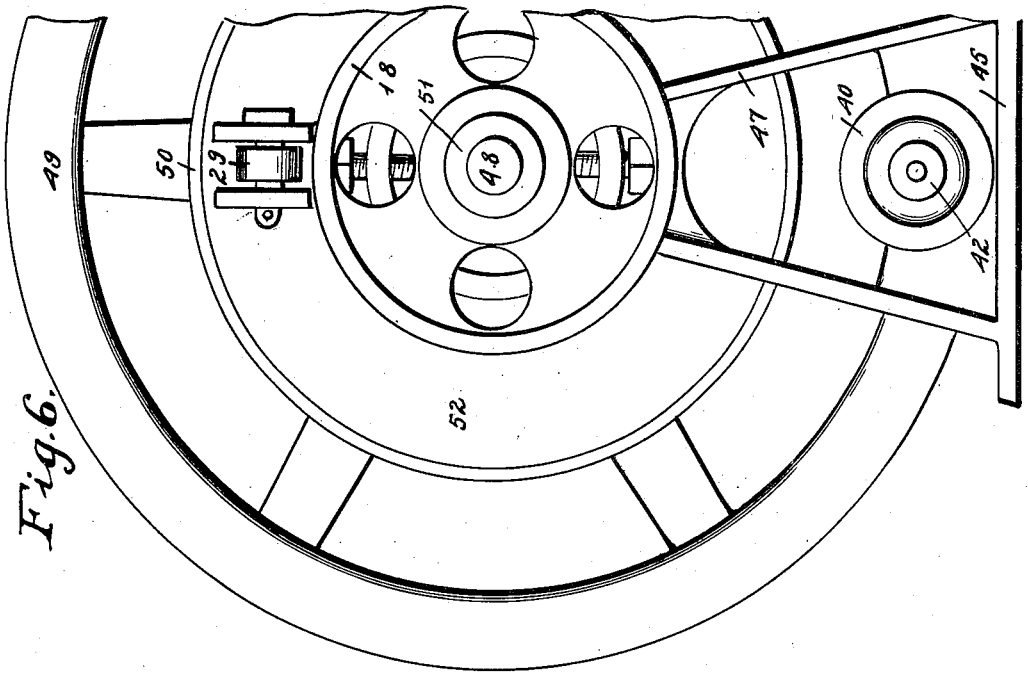
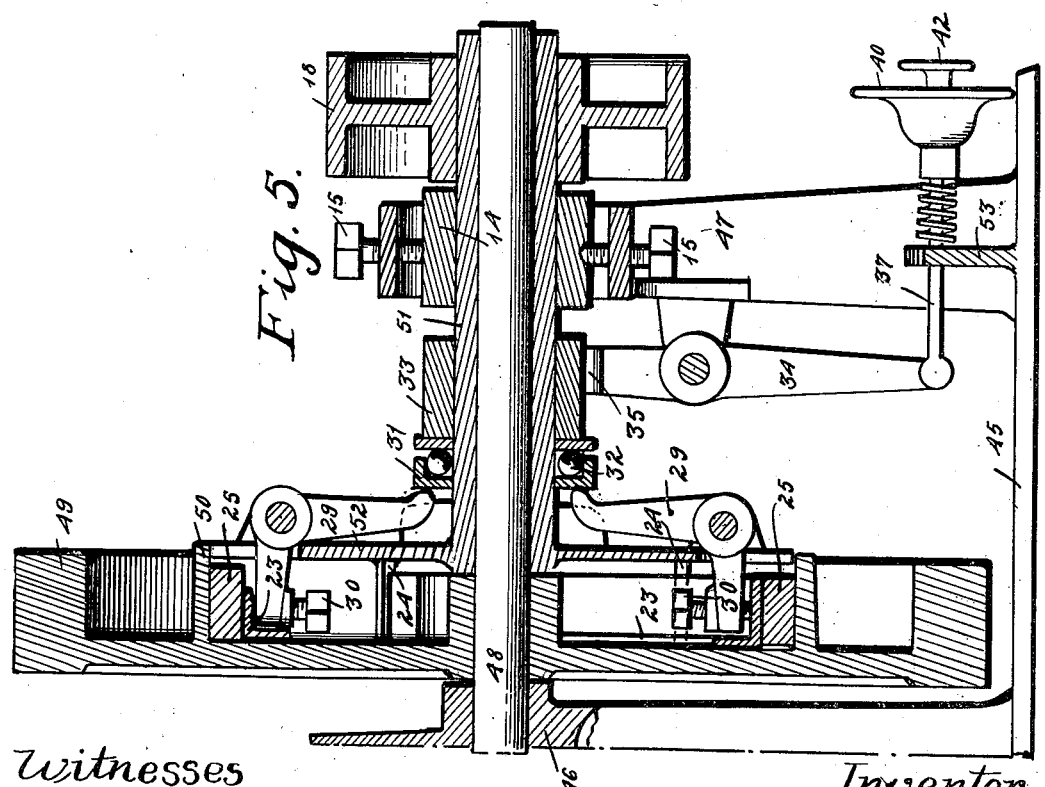
Witnesses
A. G. Hague.
W. A. Loftus.
Inventor
Charles P. Strite
by J Ralph Orwig atty

UNITED STATES PATENT OFFICE.

CHARLES P. STRITE, OF CEDAR RAPIDS, IOWA, ASSIGNOR TO CEDAR RAPIDS FOUNDRY AND MACHINE COMPANY, OF CEDAR RAPIDS, IOWA, A CORPORATION OF IOWA.

GOVERNOR-PULLEY DEVICE.

1,109,877.  Specification of Letters Patent.  Patented Sept. 8, 1914.

Application filed May 1, 1911. Serial No. 624,293.

*To all whom it may concern:*

Be it known that I, CHARLES P. STRITE, a citizen of the United States, residing at Cedar Rapids, in the county of Linn and State of Iowa, have invented a certain new and useful Governor-Pulley Device, of which the following is a specification.

The object of my invention is to provide a governor pulley device of simple, inexpensive and compact construction especially adapted for use in connection with the transmission of power from a shaft that is driven at variable speeds such, for instance, as that operated by an internal combustion engine to a machine that must be driven at a certain predetermined speed such, for instance, as a centrifugal separator.

A further object is to provide a governor of this kind that occupies a minimum of space and in which the parts are readily accessible for adjustment or repair.

A further object is to provide improved and simplified means for adjusting the governor pulley so that the speed of rotation at which it will commence to operate the driven pulley may be accurately predetermined; and also in this connection to provide means whereby, when the governor pulley device has once been set to operate the driven pulley at a predetermined speed, it may readily and easily be reset to the same position with great accuracy.

Figure 1:
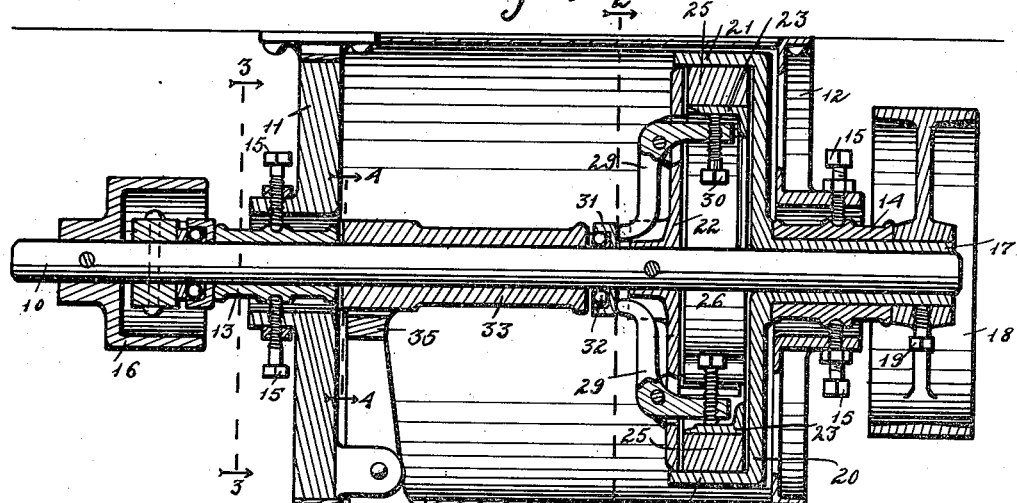
Figure 4:
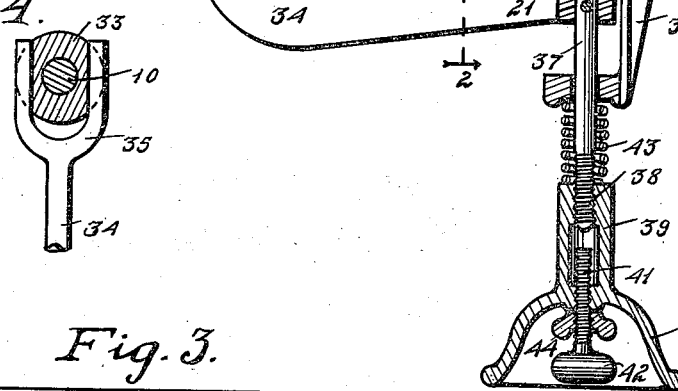
Figure 3:
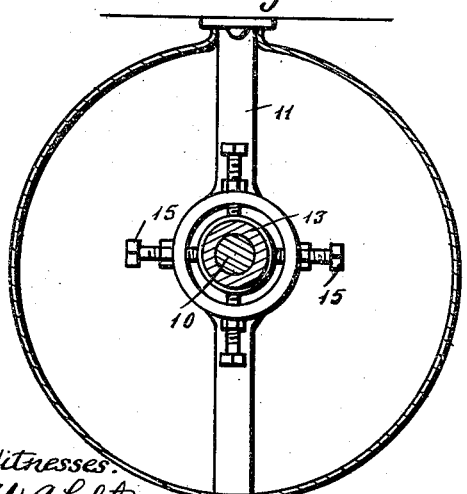
Figure 2:
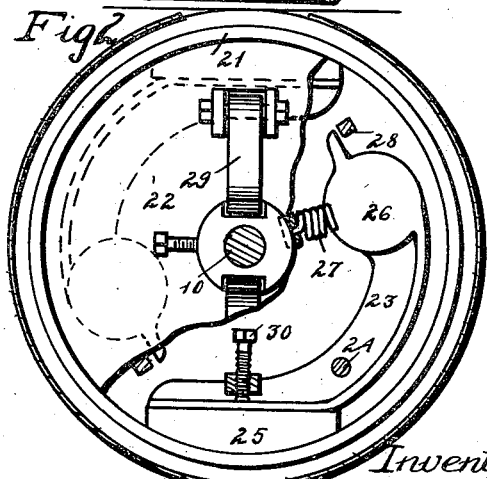

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a central, longitudinal, sectional view of my improved governor pulley device applied to an elevated support and extended downwardly therefrom. Fig. 2 shows a sectional view on the line 2—2 of Fig. 1. Fig. 3 shows a sectional view on the line 3—3 of Fig. 1. Fig. 4 shows a sectional view on the line 4—4 of Fig. 1. Fig. 5 shows a vertical, central, sectional view of a slightly modified form of my invention set upon a horizontal base and applied direct to the shaft of an internal combustion engine, and Fig. 6 shows an end elevation of same.

Referring to the accompanying drawings, I have used the reference numeral 10 to indicate the shaft to which the governor pulley device is applied. Two frame members 11 and 12 are provided for supporting the various parts of the governor pulley and these frame members have bearings 13 and 14 for the shaft, which bearings are supported in the frames by adjusting screws 15 so that the bearings may be accurately alined relative to the shaft. On one end of the shaft 10 the driving pulley 16 is fixed and on the other end there is a rotatable sleeve 17 to which the driven pulley 18 is fixed by means of a set screw 19. The said sleeve is extended through the bearing member 14 as clearly shown in Fig. 1. Formed integral with the sleeve 17 is a friction wheel 20 having a flange 21. Fixed to the shaft 10 adjacent to the friction wheel is a disk 22 and to this disk I have pivoted two curved levers 23 mounted on the pivot pins 24 which are attached to the disk 22. Each lever has on one end a friction shoe 25 and on the other end a weight 26. The weight has an extensible coil spring 27 attached to it and extended inwardly and attached to a part of the disk 22. There is also a lug 28 for each weight to limit its outward movement, said lug being attached to the disk 22. The said springs tend to yieldingly hold the friction shoes away from contact with the flange 21. Pivotally mounted in the disk 22 are two levers 29, each having one end extended adjacent to one of the friction shoes 25 and in said end is an adjusting screw 30 to engage the lever 23 adjacent to the friction shoe. The remaining ends of said levers are inclined toward each other adjacent to the shaft 10, as clearly shown in Fig. 1, and they engage a ball bearing cup 31 rotatably mounted on the shaft 10 and provided with bearing balls 32.

Slidingly and rotatably mounted upon the shaft 10 is a sleeve 33 having one end designed to engage the bearing balls 32 and having its other end pivotally connected to a lever 34, there being a fork 35 on said lever to enter slots in the sides of the sleeve 33, as shown in Fig. 4. The said lever 34 is preferably extended radially from the shaft 10 and then in a direction substantially parallel with the shaft 10, as shown in Fig. 1. By this construction, it is obvious that when the outer end of the lever 34 is pulled downwardly from the position shown in Fig. 1, the sleeve 33 will engage the bearing balls 32 and tend to cause the levers 29 to hold the friction shoes in engagement with the rim 21.

In order to provide for accurate adjustment of the amount of pressure to be applied to the lever 34, I have provided the following device: Formed on or fixed to the frame 12 is an arm 36 and slidingly mounted in said arm is a rod 37, one end of which is pivoted to the lever 34 and the other end is screw threaded at 38. Mounted upon this screw threaded portion is a substantially cylindrical nut body portion 39 having formed on its outer end a substantially cup-shaped handle portion 40. Within this handle portion is a gage screw 41 seated in the cup-shaped handle portion and in line with the rod 37, there being a head 42 on the screw 41 preferably arranged wholly within the cup-shaped portion 40 so that the operator may freely grasp and turn the cup-shaped portion 40 without engaging or changing the position of the screw 41 relative to said cup-shaped portion. An extensible coil spring 43 is mounted on the rod 37 between the stationary arm 36 and the nut 39. A lock nut 44 is placed on the screw 41 to engage the cup-shaped handle portion 40 and limit the movement of the screw 41.

In practical operation with this form of my invention and assuming that it is desired to operate the driven pulley 18 by means of a variable power such, for instance, as that derived from an internal combustion engine, or the like, then the operator moves the cup-shaped handle portion 40 toward the outer end of the rod 37 or until the tension of the spring 43 is relieved, whereupon the shaft 10 may rotate freely and the friction shoes 25 will be held out of engagement with the friction rim 21 on account of the extensible springs 27. After the internal combustion engine has started and attained its maximum speed and efficiency, then the operator may, by a manipulation of the cup-shaped handle 40, apply a pressure to the spring 43 sufficient to cause the sleeve 33 to act upon the levers 29 in such a manner as to overcome the pressure of the springs 27 so that the weights 26 are drawn inwardly, thus permitting the friction shoes 25 to engage the friction rim 26. By a careful manipulation of the cup-shaped handle 40 the friction shoes may be made to engage the friction rim 21 to only a slight degree at first and then later to an increasing degree until the driven pulley attains its maximum speed, thus avoiding a sudden shock caused by quickly starting the driven pulley.

In devices of this kind it is desirable that the operator may set the device so that the driven pulley will operate only at a certain predetermined speed and in order to accurately accomplish this result, I have provided a gage screw 41. This gage screw may be originally set in proper position as follows: First, the device may be operated until, from practical demonstration, it is determined that the driven pulley is being operated at the desired speed and that the weights 26 will operate by centrifugal force to release the friction clutches to permit the driven pulley to rotate at the predetermined speed even though the shaft travels faster; then the gage screw 41 is adjusted within the cup-shaped handle 40 until its inner end engages the outer end of the rod 37, whereupon its lock nut 44 is tightened to hold the gage screw firmly in said position; then after the device has been stopped, and assuming that it is desired to again start the internal combustion engine, the operator may unscrew the cup-shaped handle 40 until the friction shoes are free from the friction rim and start the engine in the manner before described and then at once turn the cup-shaped handle 40 to its inner limit of movement as determined by the gage screw 41, whereupon the driven pulley will increase in speed until the driving shaft has reached a certain predetermined speed of rotation and then the rotation of the driven pulley will remain the same even though the speed of the shaft 10 increases above the predetermined rate so that the operator need not experiment further with the device in order to have the driven pulley operate at a certain predetermined speed.

In the modification illustrated in Figs. 5 and 6, I have illustrated a construction especially designed to be applied direct to the shaft of an internal combustion engine and to be mounted on the base of said engine, which device is so arranged as to be of compact form and of simple construction. In said modified forms, the numeral 45 is used to indicate the engine base having thereon the two bearings 46 and 47 for the engine shaft 48. The engine balance wheel 49 is fixed to the shaft 48 and it is provided with a friction flange 50. Rotatably mounted upon the shaft 48 is a sleeve 51 having at one end a disk 52 corresponding to the disk 22 and mounted on the disk 52 are the levers 29 carrying the friction shoes 25. The ball bearing cup 31 is mounted on the sleeve 51 instead of directly on the shaft, as shown in Fig. 1, and the sliding sleeve 33 is also mounted on the sleeve 51. The driven pulley 18 is mounted upon the sleeve 51 instead of the sleeve 17.

In the form of my invention shown in Fig. 5, the lever 34 is shown to be straight and the guide arm 53 for the rod 37 is fixed to the base 45. The operation of the device shown in the modification is exactly like that just described for the preferred form of my invention. The advantage however that is gained by the modified construction is that a governor device is provided that may be applied direct to the base and the frame of an internal combustion engine and the mechanism arranged in very compact form on account of the sleeve 51 being mounted on the the shaft 48 and having the governing mechanism applied directly to it instead of to an extension of the shaft 48 and the balance wheel for the engine is arranged to also carry the friction rim to thereby further economize in the cost of construction and to provide a compact governing device. The principles of operation of both forms of my invention are the same.

I claim as my invention:

1. In a device of the class described, the combination of a rotatable friction wheel, a disk independently rotatable relative to the friction wheel, centrifugally operated friction shoes carried by said disk, springs tending to hold the friction shoes out of engagement with the friction wheel, levers connected to the friction shoes, a sliding collar to engage the levers, a lever pivoted to a stationary support and operatively connected with the sliding collar, a rod pivoted to the lever, a stationary support through which the rod is extended, an extensible spring on the rod to engage the stationary support, and a threaded hand-wheel on the rod to engage said spring.

2. In a device of the class described, the combination of a rotatable friction wheel, a disk independently rotatable relative to the friction wheel, centrifugally operated friction shoes carried by said disk, springs tending to hold the friction shoes out of engagement with the friction wheel, levers connected to the friction shoes, a sliding collar to engage the levers, a lever pivoted to a stationary support and operatively connected with the sliding collar, a rod pivoted to the lever, a stationary support through which the rod is extended, an extensible spring on the rod to engage the stationary support, a threaded hand-wheel on the rod to engage said spring, and a gage screw seated in the hand-wheel to engage said rod.

3. In a device of the class described, the combination of a rotatable friction wheel, a disk independently rotatable relative to the friction wheel, centrifugally operated friction shoes carried by said disk, springs tending to hold the friction shoes out of engagement with the friction wheel, levers connected to the friction shoes, a sliding collar to engage the levers, a lever pivoted to a stationary support and operatively connected with the sliding collar, a rod pivoted to the lever, a stationary support through which the rod is extended, an extensible spring on the rod to engage the stationary support, a threaded hand-wheel on the rod to engage said spring, a gage screw seated in the hand-wheel to engage said rod, and a lock nut for the gage screw.

4. In a device of the class described, the combination of a friction wheel, a disk rotatable relative thereto, centrifugally operated friction shoes to engage the friction wheel, a sliding collar, means actuated by the sliding collar for forcing the friction shoes into engagement with the friction wheel, a lever connected with the sliding collar, a rod pivoted to the lever, a stationary support through which said rod is extended, an extensible coil spring on the rod, and in engagement with the support, a substantially cup-shaped handle screwed to said rod, and an adjustable gage screw seated in said handle in line with said rod, for the purposes stated.

5. In a device of the class described, the combination of a friction wheel, a disk rotatable relative thereto, centrifugally operated friction shoes to engage the friction wheel, a sliding collar, means actuated by the sliding collar for forcing the friction shoes into engagement with the friction wheel, a lever connected with the sliding collar, a rod pivoted to the lever, a stationary support through which said rod is extended, an extensible coil spring on the rod, and in engagement with the support, a substantially cup-shaped handle screwed to said rod, an adjustable gage screw seated in said handle in line with said rod, and a lock nut on said adjustable gage screw to engage a part of said cup-shaped handle.

6. In a device of the class described, the combination of a shaft, a friction wheel rotatably mounted thereon, levers pivoted on said wheel, having friction shoes on one end for engaging the wheel and weights on the other end, means for yieldingly holding said levers in position for causing the shoes to engage the friction wheel, a sleeve slidably and rotatably mounted on said shaft, means carried by said sleeve arranged to force said shoes against said friction wheel in one position of the movement of said sleeve, and adjustable yielding means for fixing said sleeve in various positions of its movement.

Des Moines, Iowa, April 20, 1911.

CHAS. P. STRITE.

Witnesses:
Jos. Cockfield,
D. B. Getty.